March 31, 1970     L. A. NIKOLSKY     3,503,117

METHOD OF BUTT-WELDING OF PARTS AND DEVICE FOR EFFECTING SAME

Filed May 15, 1967

United States Patent Office 3,503,117
Patented Mar. 31, 1970

3,503,117
METHOD OF BUTT-WELDING OF PARTS AND DEVICE FOR EFFECTING SAME
Leonid Alexandrovich Nikolsky, Dokhturovsky pereulok 20, kv. 13, Moscow, U.S.S.R.
Filed May 15, 1967, Ser. No. 638,202
Int. Cl. B23k 31/02
U.S. Cl. 29—470.1                    3 Claims

ABSTRACT OF THE DISCLOSURE

A welding method comprises abutting two parts to be welded and extruding a filler metal, under welding pressure, in a direction normal to the axis of the parts and at the surfaces thereof to be welded together to cause the adjoining ends of the parts to be displaced and replaced by filler metal. The filler metal is cleaned of oxide coatings or the like when extruded and before introduction between the parts.

---

The present invention relates to high-efficiency methods of welding, providing for obtaining physico-mechanical properties of the deposited metal in the welded joint zone equalling those of the base metal.

Known in the prior art are methods of butt welding, such as argon-arc, contact butt-welding, welding with the use of an electron beam or an electric arc in the vacuum, diffusion welding, cold pressing, and some other types of welding.

All these methods of welding have the following specific disadvantages, limiting their application with a view of obtaining heavy-duty parts by using the butt-welding of pressed profiled sections of large size and complicated shape, for example, of thermo-hardening, high-strength, difficult to weld or heterogeneous aluminium alloys.

The application of all these types of welding for the indicated cases does not provide for obtaining the mechanical strength and corrosion resistance of the welded joint zone equalling those of the base metal.

Besides, in cases of application of the contact butt-welding there are required large power capacities; when effecting the diffusion vacuum welding there is required a very difficult operation of adjusting the surfaces to be butted, while the pressure welding requires very considerable pressures when welding together parts of large sections.

An object of the present invention is to eliminate the above-said disadvantages.

The principal object of the present invention is to provide a method of butt-welding of parts providing for obtaining the mechanical strength and corrosion resistance of the deposited metal in the welded joint zone equalling those of the base metal, and a device for effecting same.

According to the present invention, this object is achieved due to the fact that the pressure in the welded joint zone, as required for effecting the welding process, produced by the aid of a filler metal which is preferably extruded in the normal direction relative to the longitudinal axis of the parts to be welded of an article, said filler metal being cleaned during the extruding operation, displacing thereby from the welded joint zone the material of the parts to be welded of the article adjoining the ends to be butted.

A device for effecting the proposed method is essentially a container adjoining the body, accommodating the ends of the article to be welded; a detachable lining with a hole smaller than the hole of the container is provided between the hole of the container and the area of the butt joint between the parts of the article to be welded, while a receiver for the material to be displaced of the parts to be welded of the article is provided over the area of the butt joint of the parts to be welded of the article. The receiver must be made according to a stepped design for adjusting the stress conditions and flow of metal in the welded joint zone.

The nature of the present invention will further be made more fully apparent from a consideration of the following description of an exemplary embodiment thereof, taken in conjunction with the accompanying drawings, in which.

Figure 1:
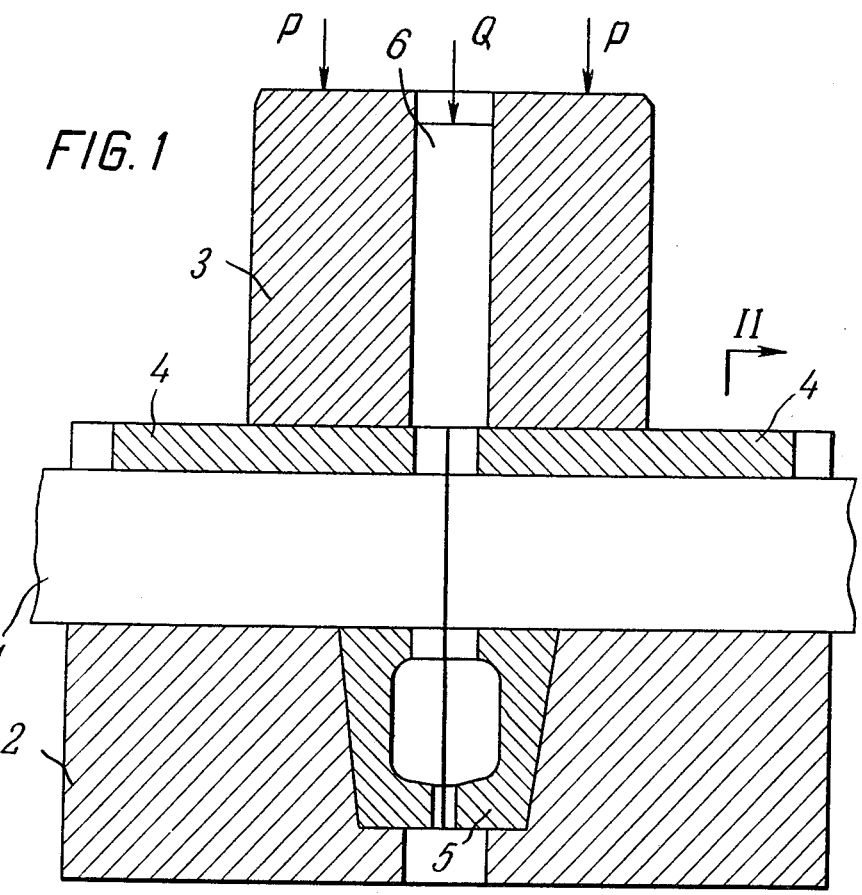
FIG. 1 is a schematic diagram of the device of the invention.
Figure 2:
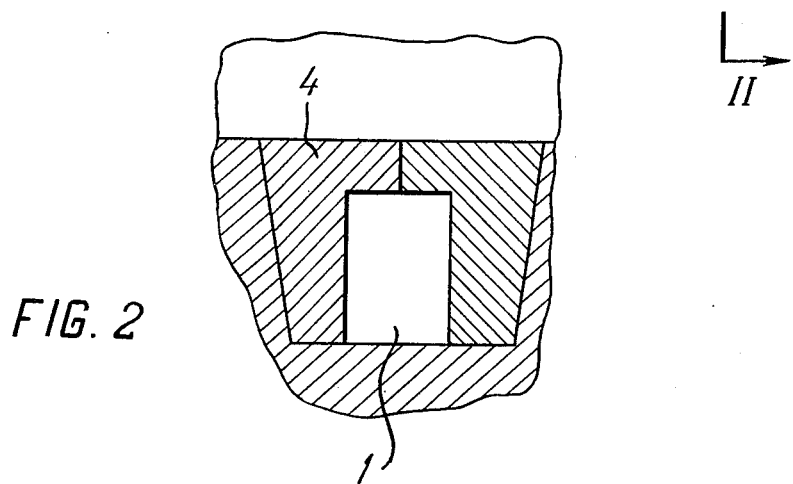
FIG. 2 is a cross-sectional view of same, taken along the line II—II.

The ends of the parts to be welded of an article 1 (FIGS. 1 and 2) are disposed in a plane of a body 2 in such a manner that the area of the butt joint between the parts of the article 1 should be disposed between a detachable lining 4 and a stepped receiver 5 coaxial with holes of a container 3.

A filler metal 6 placed into the cavity of the container 3 is extruded under the action of a force Q through the hole of the detachable lining 4, pressing thereby on the surface of the parts of the article 1 near the welded joint, said surface being limited by the profile of said hole, and forces the material of the parts of the article to be welded 1, adjoining the area of the welded joint, into the broad cavity of the stepped receiver 5. The volume of the broad cavity of the stepped receiver 5 is selected in such a manner as to allow extruding there into the ends of the parts to be welded of the article 1 and the filler metal 6. Upon filling the broad cavity of the stepped receiver 5, the material meets a narrow slot and begins to penetrate therein.

The hole in the detachable lining is intended for cleaning the lateral surface of the filler metal 6 and forming thereon an adjoining surface during the extrusion process.

In case of welding metals, it is intended for the removal of the oxide film, which remains on the surface of the container 3 in the form of a thin envelope.

In the process of extruding there occurs the deformation of the ends of the parts to be welded of the article 1 along the axis, which results in the filling of gaps therebetween and corresponding surfaces of the body 2 and lining 4, which is likely to isolate the deformation area from the external medium and to brake the movement of the parts to be welded of the article in the direction of the longitudinal axis. Cleaned from the oxides, the adjoining surfaces of the base and filler metals are brought in contact with each other, owing to which there is effected their mutual deformation, interpenetration and diffusion under conditions of high compressive stresses and the activation energy, which results in their strong adhesion to each other.

The narrow slot of the receiver 5 is intended for adjusting the direction of flow, speed and stress conditions of the material in the welding zone.

At the moment of beginning of the forcing of the material into the narrow slot, the stress is increased and simultaneously the direction of flow of metal in the welding zone is varied, which contributes to a still stronger adhesion of the material. The broad cavity of the stepped receiver 5 is made widening with a narrow inlet strain belt, while the receiver itself is made according to the detachable design.

The detachable lining 4 may be designed so as to be inserted into the container, while the container is made in a multilayer design.

The cavity of the body 2, where the ends of the parts to be welded of the article 1 are placed, may be designed as a set of exchangeable linings whose shape corresponds to the shape of the parts of the article to be welded.

To carry into effect the welding process requires the provision of a tight adjoining of the container to the body, precluding both the formation of gaps as produced by the development of high stresses in the deformation area and the forcing of the material into these gaps.

The force P, as required for pressing the container 3 against the body 2, depends upon the shape and dimensions of the section of the parts to be welded of the article 1; it is by as much as 2 to 3 times greater than the force Q as required for the extrusion of the filler metal.

The pressing may be effected by the aid of special sub-assemblies of the device in case of the operation on a univrsal equipment or by the aid of a special-purpose equipment.

The welding is effected by heating the ends of the parts to be welded of the article 1 and the filler metal 6 in the range of forging temperatures.

The optimum welding temperature for each grade of the material to be welded is determined by experiment.

The method of welding disclosed in the present specification may be employed for the manufacture of projections, ribs, partitions, etc. on the pressed profiled sections. Said structural members may be obtained simultaneously when butt-welding profiled sections or specifically by forcing the filler metal through the body of the profiled body section simultaneously with the welding-on of the filler metal.

The shape and dimensions of the cavities of the container 3, detachable lining 4 and receiver 5 are to be selected in this case in such a manner that they should enable obtaining the required shape of structural members.

What is required is:

1. A method of butt-welding two parts, said method comprising applying two parts to be welded into abutment with one another along surfaces to be welded together, and extruding a filler metal, under pressure, in a direction normal to the axis of the parts and at the surfaces to be welded together to cause the adjoining ends of the parts to be displaced and replaced by filler metal, said filler metal being cleaned when extruded and before introduction between the parts.

2. A method as claimed in claim 1 comprising heating the adjoining ends of the parts and the filler metal to forging temperatures.

3. A method as claimed in claim 2 comprising regulating the pressure of extrusion by controlling the flow of filler metal past the adjoining ends.

References Cited

UNITED STATES PATENTS 2,894,321   7/1959   Dubilier _____ 29—497.5 X

FOREIGN PATENTS 726,070   10/1942   Germany.
1,129,037   5/1962   Germany.
427,912   5/1935   Great Britain.

JOHN F. CAMPBELL, Primary Examiner

RONALD J. SHORE, Assistant Examiner

U.S. Cl. X.R.

29—470, 497.5; 228—3